United States Patent
Tensmeyer et al.

(10) Patent No.: US 11,880,655 B2
(45) Date of Patent: Jan. 23, 2024

(54) FACT CORRECTION OF NATURAL LANGUAGE SENTENCES USING DATA TABLES

(71) Applicant: Adobe Inc., San Jose, CA (US)

(72) Inventors: Christopher Tensmeyer, Columbia, MD (US); Danilo Neves Ribeiro, Los Angeles, CA (US); Varun Manjunatha, Newton, MA (US); Nedim Lipka, Campbell, CA (US); Ani Nenkova, Philadelphia, PA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/724,349

(22) Filed: Apr. 19, 2022

(65) Prior Publication Data

US 2023/0334244 A1 Oct. 19, 2023

(51) Int. Cl.
*G06F 40/226* (2020.01)
*G06F 40/284* (2020.01)
(Continued)

(52) U.S. Cl.
CPC ...... *G06F 40/284* (2020.01); *G06F 16/24535* (2019.01); *G06F 40/226* (2020.01); *G06N 20/20* (2019.01)

(58) Field of Classification Search
CPC .... G06F 16/258; G06F 40/117; G06F 40/169; G06F 40/194; G06F 40/226; G06F 40/284; G06F 40/30; G06N 20/00
(Continued)

(56) References Cited

U.S. PATENT DOCUMENTS 9,015,098 B1 * 4/2015 Crosley .................. G06F 40/30
706/46
2014/0281935 A1 * 9/2014 Byron .................. G06F 40/177
715/249

(Continued)

FOREIGN PATENT DOCUMENTS

EP 4068116 A1 * 10/2022 ............. G06N 20/00
WO WO 2019/043380 * 3/2019
WO WO-2022087688 A1 * 5/2022

OTHER PUBLICATIONS

Chen, W. et al., "TabFact: A Large-scale Dataset for Table-based Fact Verification," arXiv:1909.02164 [cs.CL], Sep. 5, 2019, pp. 1-12.

(Continued)

*Primary Examiner* — Martin Lerner
(74) *Attorney, Agent, or Firm* — Nicholson De Vos Webster & Elliott LLP

(57) ABSTRACT

Embodiments are disclosed for performing fact correction of natural language sentences using data tables. In particular, in one or more embodiments, the disclosed systems and methods comprise receiving an input sentence, tokenizing elements of the input sentence, and identifying, by a first machine learning model, a data table associated with the input sentence. The systems and methods further comprise a second machine learning model identifying a tokenized element of the input sentence that renders the input sentence false based on the data table and masking the tokenized element of the tokenized input sentence that renders the input sentence false. The systems and method further includes a third machine learning model predicting a new value for the masked tokenized element based on the input sentence with the masked tokenized element and the identified data table and providing an output including a modified input sentence with the new value.

20 Claims, 10 Drawing Sheets

(51) Int. Cl.
  *G06F 40/30* (2020.01)
  *G06N 20/00* (2019.01)
  *G06F 16/2453* (2019.01)
  *G06N 20/20* (2019.01)
(58) Field of Classification Search
  USPC ......... 704/1, 9, 10; 706/12, 52, 55; 707/749, 707/760
  See application file for complete search history.

(56) References Cited

U.S. PATENT DOCUMENTS

| | | | | |
|---|---|---|---|---|
| 2019/0361961 | A1* | 11/2019 | Zambre | G06F 40/166 |
| 2020/0160196 | A1* | 5/2020 | Ramakrishnan | G06N 20/20 |
| 2021/0089956 | A1* | 3/2021 | Barboni | G06N 20/00 |
| 2021/0182496 | A1* | 6/2021 | Shi | G06F 40/30 |
| 2022/0067281 | A1* | 3/2022 | Hu | G06F 40/284 |
| 2022/0075953 | A1* | 3/2022 | Khetan | G06F 40/284 |
| 2022/0171935 | A1* | 6/2022 | Goyal | G06F 40/30 |
| 2022/0237382 | A1* | 7/2022 | Abraham | G06F 40/30 |
| 2022/0309107 | A1* | 9/2022 | Sen | G06F 40/35 |
| 2022/0382795 | A1* | 12/2022 | Sengupta | G06F 40/30 |
| 2023/0065915 | A1* | 3/2023 | Berestovsky | G06V 30/414 |

OTHER PUBLICATIONS

Devlin, J. et al., "BERT: Pre-training of Deep Bidirectional Transformers for Language Understanding," arXiv preprint arXiv:1810.04805 [cs.CL], Oct. 11, 2018, pp. 1-14.

Dong, R. et al., "Structural Encoding and Pre-training Matter: Adapting BERT for Table-Based Fact Verification," Proceedings of the 16th Conference of the European Chapter of the Association for Computational Linguistics, Apr. 2021, pp. 2366-2375.

Iso, H. et al., "Fact-Based Text Editing," Proceedings of the 58th Annual Meeting of the Association for Computational Linguistics, Jul. 2020, pp. 171-182.

Parikh, A.P. et al., "ToTTo: A Controlled Table-To-Text Generation Dataset," arXiv preprint arXiv:2004.14373v1 [cs.CL], Apr. 29, 2020, pp. 1-14.

Raffel, C. et al., "Exploring the Limits of Transfer Learning with a Unified Text-to-Text Transformer," arXiv preprint arXiv:1910.10683, Oct. 23, 2019, pp. 1-52.

Reimers, N., et al., "Sentence-BERT: Sentence Embeddings using Siamese BERT-Networks," Proceedings of the 2019 Conference on Empirical Methods in Natural Language Processing and the 9th International Joint Conference on Natural Language Processing, Nov. 2019, pp. 3982-3992.

Shah, D.J., et al., "Automatic Fact-Guided Sentence Modification," Proceedings of the AAAI Conference on Artificial Intelligence, vol. 34, 2020, pp. 8791-8798.

Shi, Q., et al., "Learn to Combine Linguistic and Symbolic Information for Table-based Fact Verification," Proceedings of the 28th International Conference on Computational Linguistics, Dec. 2020, pp. 5335-5346.

Thorne, J., et al., "Evidence-based Factual Error Correction," Proceedings of the 59th Annual Meeting of the Association for Computational Linguistics and the 11th International Joint Conference on Natural Language Processing, Aug. 2021, pp. 3298-3309.

Zhou, J., et al., "GEAR: Graph-based Evidence Aggregating and Reasoning for Fact Verification," Proceedings of the 57th Annual Meeting of the Association for Computational Linguistics, Jul. 2019, pp. 892-901.

\* cited by examiner

FACT CORRECTION OF NATURAL LANGUAGE SENTENCES USING DATA TABLES

BACKGROUND

The proliferation of incorrect information or disinformation (e.g., incorrect statements designed to mislead) is a significant problem For example, disinformation or "fake news" has become commonplace on the internet, and on social media in particular. Incorrect information can also be proliferated non-maliciously, e.g., based on a user retrieving information from inaccurate data sources. In either context, it can be difficult for a user to determine whether an assertion made in an article, a document, etc., is factually correct. It can further be difficult for the user to determine where information either confirming or refuting the assertion can be found.

Existing solutions have limitations and drawbacks, as some act only as verification systems that can only indicate whether a statement is true or false.

SUMMARY

Introduced here are techniques/technologies that allow a fact correction system to evaluate a natural language sentence, determine whether it contains factually incorrect assertions using retrieved data tables, and, using the retrieved data tables, replace elements of the natural language sentence to make it factually correct.

In particular, in one or more embodiments, the fact correction system can receive a natural language sentence as an input and tokenize elements of the natural language natural language sentence. The fact correction system can then identify a data table associated with the input sentence using a first machine learning model. A second machine learning model can then be used to identify one or more tokenized elements of the input sentence that render the input sentence false based on the data table and generate a masked sentence with the one or more identified tokenized elements masked out. The fact correction system then predicts a new token for each of the one or more masked tokenized element based on the input sentence with the one or more masked tokenized element and the identified data table using a third machine learning model. The fact correction system can then generate a modified input sentence, with the predicted new token(s) replacing the one or more tokens that renders the input sentence false, as the output. In one or more embodiments where the input sentence includes an accurate assertion, and thus fact correction is not necessary, the second machine learning model would identify zero elements of the input sentence for tokenization. In such situations, because there are no elements of the input sentence that are masked by the second machine learning model, the third machine learning model is not run on this input sentence, and the input sentence is provided as the output of the fact correction system.

The machine learning models can be trained using training data that includes paired factually incorrect and corrected natural language sentence and data tables correlated to natural language sentences.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a fact correction system that uses a trained machine learning models retrieve data tables associated with or correlated to a natural language sentence, identify and mask elements of the natural language sentence that renders it to be false, and determine replacement values for the masked elements that make the natural language sentence true.

Some existing solutions are directed to fact verification using a corpus of text and/or tables. However, some of these existing systems only determine whether a sentence is true or false, or label sentences as "entailed," "refuted," or "not enough information." Thus, these solutions put the burden of determining the corrected sentence or information on the user of the system. This is insufficient for a good user experience. Other existing solutions can retrieve information from a database of facts, but they can only handle a corpus of information that is represented as subject-predicate-object triples, and not structured information (e.g., tables). Further, some solutions assume that that a small set of facts related to the document is already pre-identified. For example, these solutions use a given fact to correct a potentially incorrect input sentence, and thus can only perform a correction when the factual information is provided as an input. These solutions are thus limited and are not capable of addressing real world applications.

To address these issues, after receiving an input natural language sentence, the fact correction system generates sentence embeddings, or feature vectors, representing the natural language sentence. The fact correction system then retrieves table view embeddings from a pre-processed corpus of data tables, where each table view embedding can represent a row of a data table. The fact correction system then compares the sentence embeddings to the table view embeddings to identify one or more data tables most associated or correlated to the contents of the natural language sentence. Using the identified data tables, the fact correction system can then identify whether any elements (e.g., words, phrases) of the natural language sentence render the assertion in the natural language sentence factually incorrect and further determine new elements that, in place of the identified elements, would render the natural language sentence factually correct. The fact correction system can further determine whether the natural language sentence is factually correct and does not require any modifications.

Figure 1:
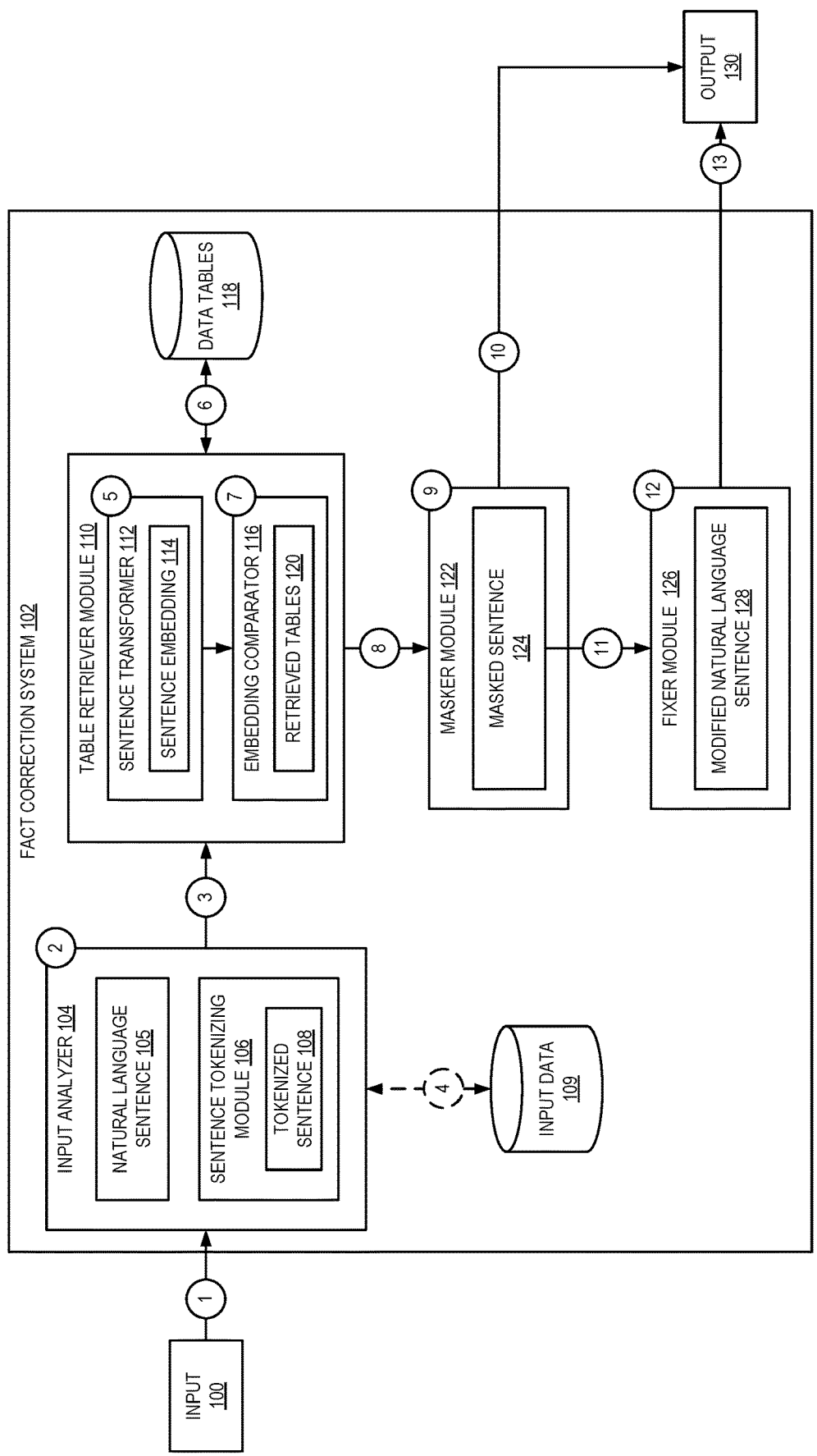
FIG. 1 illustrates a diagram of a process of using machine learning models to perform fact correction of natural language sentences based on table data in accordance with one or more embodiments.

FIG. 1 illustrates a diagram of a process of using machine learning models to perform fact correction of natural language sentences based on table data in accordance with one or more embodiments. As shown in FIG. 1, the fact correction system 102 receives an input 100, as shown at numeral 1. For example, the fact correction system 102 receives the input 100 from a user via a computing device or from a memory or storage location. In one or more embodiments, the input 100 includes a natural language sentence that includes an assertion. As illustrated in FIG. 1, the fact correction system 102 includes an input analyzer 104 that receives the input 100.

The input analyzer 104 analyzes the input 100, as shown at numeral 2. In some embodiments, the input analyzer 104 analyzes the input 100 to identify the natural language sentence 105. The input analyzer 104 can further include a sentence tokenizing module 106 configured to tokenize elements (e.g., words) in the natural language sentence 105 to generate tokenized sentence 108. In one or more other embodiments, the sentence tokenizing module 106 breaks up the natural language sentence 105 (e.g., a text string) of the input 100 into segments/pieces, e.g., words, portions of words, phrases, punctuations, etc. In one or more embodiments, punctuations can be ignored by the sentence tokenizing module 106. After being processed by the sentence tokenizing module 106, the natural language sentence 105 can be expressed as a series of tokens $c=c_1, c_2, \ldots, c_S$, where S is the number of words and/or phrases in the natural language sentence.

After the input analyzer 104 analyzes and tokenizes the input 100, the natural language sentence 105 and the tokenized sentence 108 are sent to the table retriever module 110, as shown at numeral 3. In one or more other embodiments, the input analyzer 104 optionally stores the natural language sentence 105 and the tokenized sentence 108 in a memory or storage location (e.g., input 109) for later access, as shown at numeral 4.

In one or more embodiments, the table retriever module 110 includes a sentence transformer 112 and an embedding comparator 116. The sentence transformer 112 is configured to encode the natural language sentence 105 into a sentence embedding 114, as shown at numeral 5. In some embodiments, the sentence transformer 112 encodes the text of the natural language sentence 105 into an embedding or vector. In one or more embodiments, the natural language sentence 105 is encoded into a sentence embedding 114 of size 768.

After generating the sentence embedding 114, an embedding comparator 116 accesses data tables 118, as shown at numeral 6. In one or more embodiments, the tables in data tables 118 can be pre-processed by the fact correction system 102. For example, each table in data tables 118 can be processed through the sentence transformer 112 to encode table view embeddings. However, some tables contain large amounts of data and encoding the full table can make it difficult for the model to capture all of the relevant facts contained within a table. In one or more embodiments, in order to address this issue, the sentence transformer 112 encodes each row of each table separately. To transform the table into textual input for the sentence transformer 112, a linearization technique is applied that transforms the row of a table to the following: "[Title of Table]; [Header of First Column] is [First Cell of Row]; . . . ; [Header of Last Column] is [Last Cell of Row]". Thus, table view embeddings for a table can include a plurality of row embeddings, where each row embedding of the plurality of row embeddings is associated with a single row of the data table, and where the table view embeddings can include at least a number of row embeddings equal to the number of rows in the table. After the sentence transformer 112 generates the table view embeddings, the table view embeddings can be stored with its corresponding data table in the data tables 118.

An embedding comparator 116 can identify retrieved tables 120 by comparing the sentence embedding 114 for the natural language sentence 105 with table view embeddings from the data tables 118, as shown at numeral 7. In some embodiments, the table retriever module 110 can selectively retrieve table view embeddings for data tables based on elements of the natural language sentence. For example, if the natural language sentence 105 includes the phrase "President of the United States" or "Abraham Lincoln," the table retriever module 110 can retrieve table view embeddings related to those phrases. In some embodiments, the cosine similarity, W, can be used to compute the similarity between two vectors a and b as:

$$\Psi(a, b) = \frac{ab}{\|a\|\|b\|}$$

In one or more embodiments, given a table $t \in T$ and the set of linearized rows, $r_1 \ldots, r_N$, for table t, the similarity of the table t and the natural language sentence 105 from input 100 can be computed as:

$$\max(\Psi(H_{r_1}, H_c), \ldots, \Psi(H_{r_N}, H_c)),$$

where $H_x=W[\text{SenTra}(x)]$ is the encoding that takes the output of the sentence transformer 112 and applies a linear transformation W, which is learned during a training phase. In one or more embodiments, the top K tables with the highest similarity to the natural language sentence 105 can be selected as a set of retrieved tables 120. In one or more embodiments, the truthfulness of the assertion in natural language sentence 105 is dependent on the set of retrieved tables 120.

Figure 2:
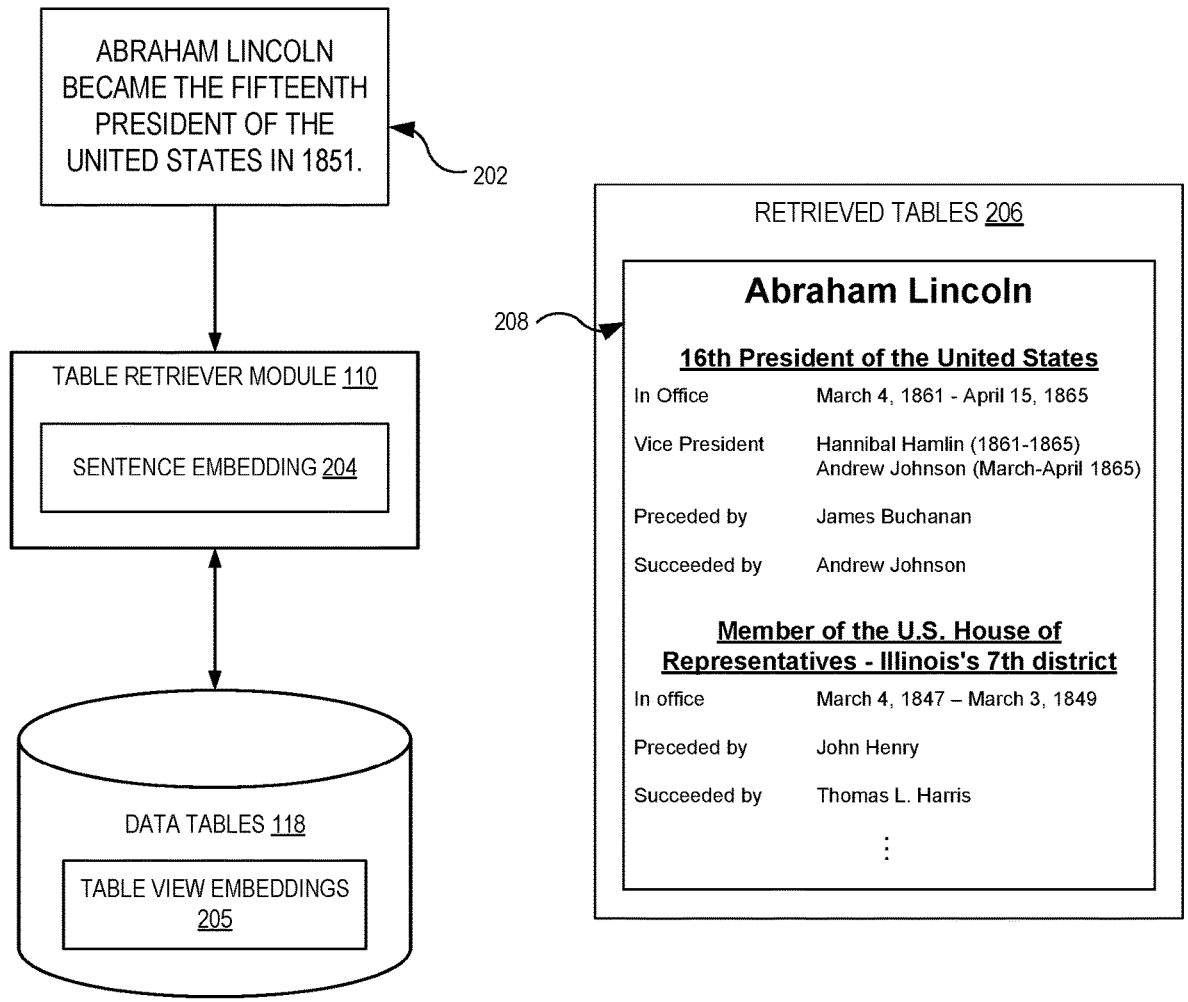
FIG. 2 illustrates an example process of retrieving tables to fact correct a natural language sentence in accordance with one or more embodiments.

FIG. 2 illustrates an example process of retrieving tables to fact correct a natural language sentence in accordance with one or more embodiments. As illustrated in FIG. 2, a natural language sentence 202 has been provided as an input to a fact correction system (e.g., fact correction system 102). In the example, the natural language sentence 202 includes the assertion, "Abraham Lincoln became the fifteenth president of the United States in 1851." After being processed by the table retriever module 110 to create a sentence embedding 204, the table retriever module 110 queries, or otherwise accesses, the data tables 118. The table retriever module 110 compares the sentence embedding 204 for the natural language sentence 202 with table view embeddings 205 for tables in the data tables 118 to retrieve a set of retrieved tables 206. As illustrated in FIG. 2, the set of retrieved tables 206 includes a table 208 with information about Abraham Lincoln.

Returning to FIG. 1, after the table retriever module 110 retrieves the set of retrieved tables 120, the set of retrieved tables 120 is sent to a masker module 122, as shown at numeral 8. Using the set of retrieved tables 120 and the tokenized sentence 108, the masker module 122 determines whether to mask out portions of the tokenized sentence 108, as shown at numeral 9.

The masker module 122 is configured to identify which tokens of the tokenized sentence 108 should be replaced, if any, with data from the set of retrieved tables 120, to make the assertion in natural language sentence 105 true (e.g., refuted by the data in the set of retrieved tables 120). In one or more embodiments, the masker module 122 is implemented using a BERT language model with a token classification head. The BERT language model takes the tokenized sentence 108 as input, and the linearized versions of the set of retrieved tables 120, in order of retrieval. In some embodiments, inputs that exceed the size of the model are trimmed. For example, if inputs to the model are limited to X number of tokens, only the first X tokens of the tokenized sentence 108 will be provided as input. The model outputs a vector [0, 1] s, where the $i^{th}$ element of the vector represents if the token should be masked.

When the masker module 122 determines, from the set of the tokenized sentence 108, that there are no tokens in the tokenized sentence 108 that should be replaced, the masker module 122 does not generate a masked sentence. For example, this is the case if the natural language sentence 105 is factually correct, based on the corpus of information in the set of the tokenized sentence 108. As a masked sentence is not generated, the masker module 122 can directly output the natural language sentence 105 as the output, bypassing the fixer module 126, as shown at numeral 10.

When the masker module 122 determines that one or more tokens of the tokenized sentence 108 should be masked for rendering the assertion in the natural language sentence 105 incorrect, the masker module 122 modifies the tokenized sentence 108 into masked sentence 124. After the masker module 122 generates the masked sentence 124, the masked sentence 124 is sent to a fixer module 126, as shown at numeral 11.

Using the set of retrieved tables 120 and the masked sentence 124, the fixer module 126 can correct the assertion in the natural language sentence 105 by replacing masked out portions of the tokenized sentence 108, as shown at numeral 12. In one or more embodiments, the fixer module 126 fine tunes a T5 language model and outputs values that can fill in the masked portions of the masked sentence 124. In some embodiments, the data tables 118 also include table view embeddings (or table feature vectors) representing the contents of each row of tables. For example, the fixer module 126 receives the masked sentence 124 prepended to linearized representations of the set of retrieved tables 120. As described previously, linearized representations of the set of retrieved tables 120 is generated via a linearization technique that transforms each row of a table to the following: "[Title of Table]; [Header of First Column] is [First Cell of Row]; . . . ; [Header of Last Column] is [Last Cell of Row]". In one or more embodiments, the fixer module 126 evaluates the masked elements or tokens of the masked sentence 124 and the table context from the set of retrieved tables 120 to determine replacement values for the masked elements. The output of the fixer module 126 can then be used to generate modified natural language sentence 128 with the assertion in the natural language sentence 105 corrected based on the data in the set of retrieved tables 120.

Figure 3:
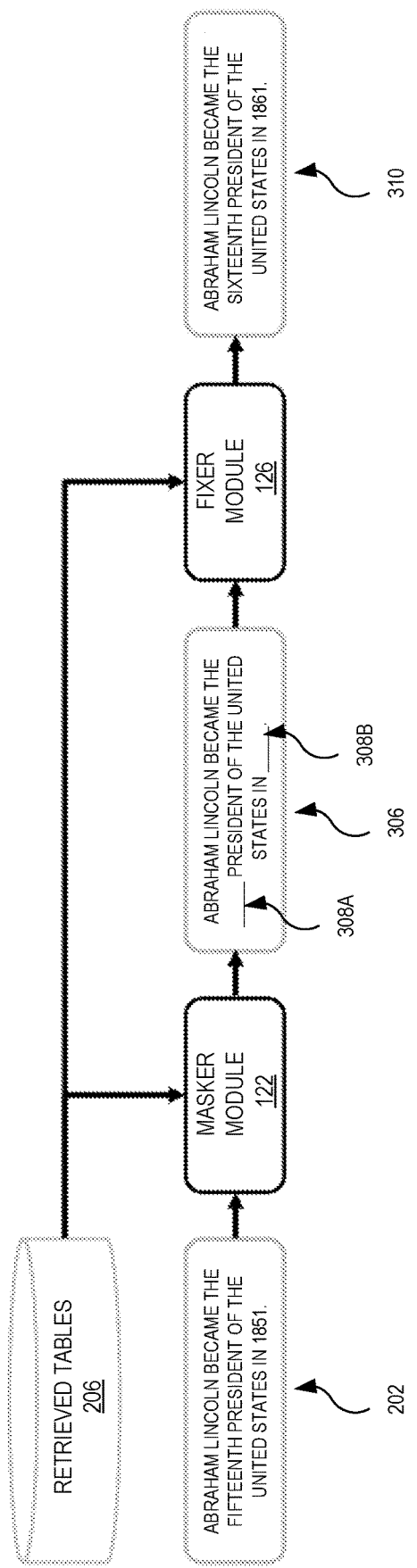
FIG. 3 illustrates an example process of fact correcting a natural language sentence using trained models in accordance with one or more embodiments.

FIG. 3 illustrates an example process of fact correcting a natural language sentence using trained models in accordance with one or more embodiments. The natural language sentence 202 and the set of retrieved tables 206 are provided to a masker module 122. In one or more embodiments, the masker module 122 masks out tokens (e.g., words, phrases, etc.) of the natural language sentence 202, to create masked sentence 306, where the masked tokens indicate words/elements that make the assertion in the natural language sentence 202 not factually correct, based on the set of retrieved tables 206. In the example of FIG. 3 and based on the set of retrieved tables 206, including table 208, "fifteenth" and "1951" can be masked to create masked tokens 308A and 308B, respectively, in masked sentence 306. The masked sentence 306 is then sent to the fixer module 126, which is configured to replace the masked tokens (e.g., 308A-B) with data (e.g., values) from the set of retrieved tables 206. Using the set of retrieved tables 206, the fixer module 126 generates modified natural language sentence 310, with replacement values for masked tokens 308A-B. For example, using table 208, the fixer module 126 replaces masked token 308A with "sixteenth" and masked token 308B with "1861" in modified natural language sentence 310 to correct the factually incorrect assertion.

Returning to FIG. 1, the fact correction system 102 provides an output 130, as shown at numeral 13. Where the natural language sentence 105 provided in input 100 was factually correct, based on the set of retrieved tables 120, the output 130 includes the natural language sentence 105 unmodified. Where the natural language sentence 105 provided in input 100 was factually incorrect, based on the set of retrieved tables 120, the output 130 includes the modified natural language sentence 128 generated by the fixer module 126. In one or more embodiments, after the process described above in numerals 1-12 the output 130 is sent to the user or computing device that initiated the fact correction process with the fact correction system 102, to another computing device associated with the user or another user, or to another system or application. For example, after the process described above in numerals 1-12, the output 130 can be displayed in a user interface of a computing device.

In one or more embodiments, the output 130 can include a ranked list of suggested changes for an element of the natural language sentence 105. For example, where the fact correction system 102 is integrated with or deployed in a word processing application, the fact correcting can operate by highlighting a word or phrase that renders an assertion in the sentence to be false. Upon selecting the highlighted word or phrase, a drop-down menu can be caused to be displayed with optional replacement words/phrases, or entire sentences, to correct the false assertion in the sentence. In such embodiments, the interaction of the user with the system can be used as a training signal to further improve the fact correction system 102. For example, when a user selects a suggested sentence from a ranked list, the selection can be used to further train the fact correction system 102 to rank that sentence first, or higher, in subsequent suggested corrections. In some embodiments, the data table used to modify the masked tokens in natural language sentence 105 can also be provided in output 130. For example, the data table or information indicating a location of the data table (e.g., a URL) can be displayed in the word processing application.

Figure 4:
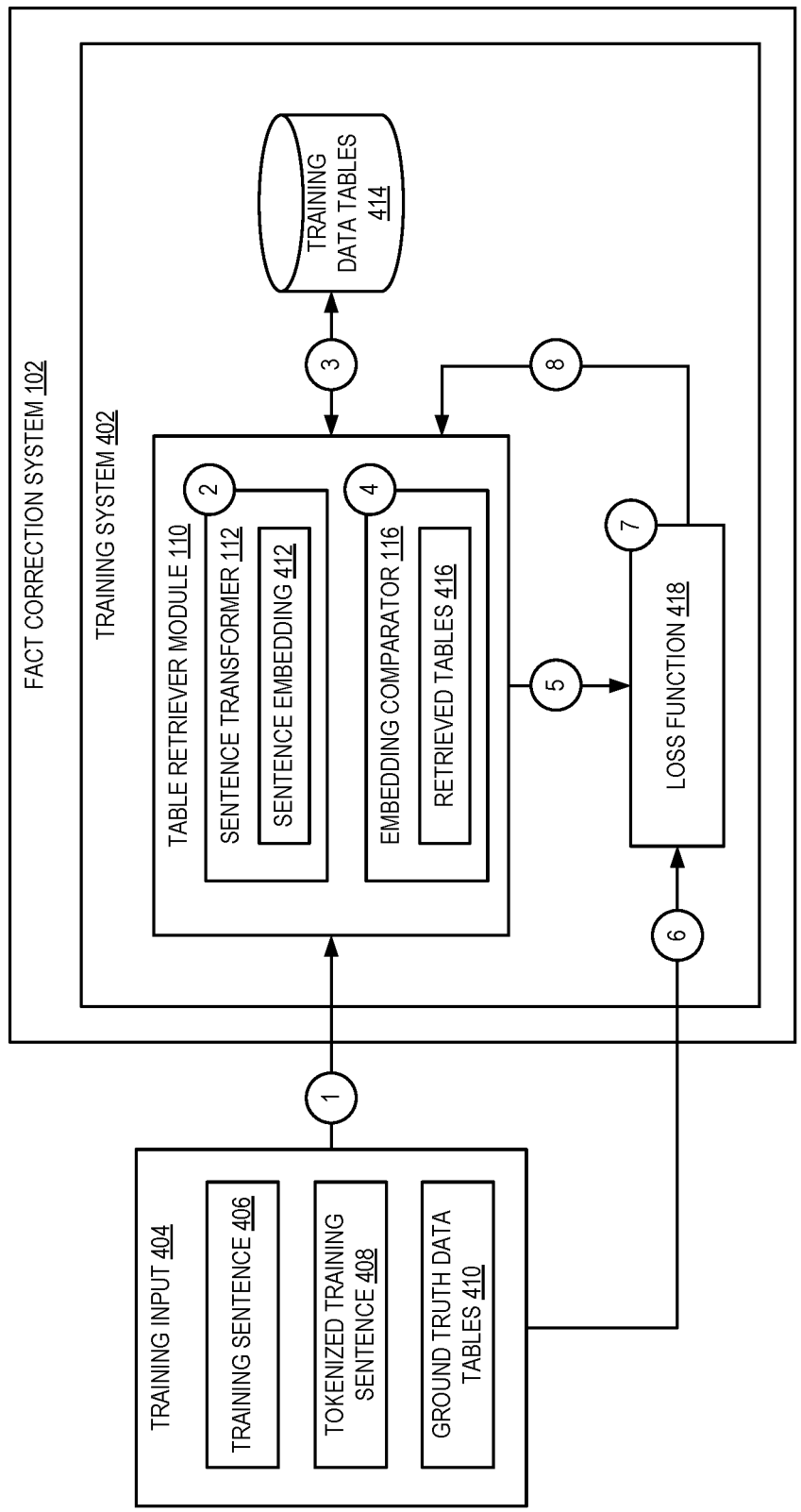
FIG. 4 illustrates a diagram of a process of training a machine learning model to retrieve data tables correlated to a natural language sentence in accordance with one or more embodiments.

FIG. 4 illustrates a diagram of a process of training a machine learning model to retrieve data tables correlated to a natural language sentence in accordance with one or more embodiments. In one or more embodiments, a training system 402 is configured to train neural networks (e.g., table retriever module 110) to retrieve data tables correlated to elements of a natural language sentence. In some embodiments, the training system 402 is a part of a fact correction system 102. In other embodiments, the training system 402 can be a standalone system, or part of another system, and deployed to the fact correction system 102. For example, the training system 402 may be implemented as a separate system implemented on electronic devices separate from the electronic devices implementing fact correction system 102. As shown in FIG. 4, the training system 402 receives a training input 404, as shown at numeral 1. For example, the fact correction system 102 receives the training input 404 from a user via a computing device or from a memory or storage location. Although the training input 404 is shown as being received by the fact correction system 102, in other embodiments, the training input 404 is received from a memory or storage location within the fact correction system 102 (e.g., training data 726 in FIG. 7). In one or more embodiments, the training input 404 includes a training sentence 406 (e.g., a natural language sentence that includes a false assertion), a tokenized training sentence 408, and ground truth data tables 410. The tokenized training sentence 408 is a version of the training sentence 406 after being processed through a sentence tokenizing module (e.g., sentence tokenizing module 106 of FIG. 1). The ground truth data tables 410 include data tables that are associated with the training sentence 406. For example, a training sentence that includes "Abraham Lincoln" and "Presidents of the United States" may be associated with a data table listing the Presidents of the United States. In some embodiments, the ground truth data tables 410 can be generated from data tables extracted from a corpus of information (e.g., Wikipedia).

In one or more embodiments, the training input 404 includes K data points containing table-assertion tuples $(T_k, R_k, c_k)|_{k=1}^{K}$, where $T_k$ and $R_k$ are parts of the ground truth data tables 410 and $c_k$ is the training sentence 406. In this tuple, $R_k = \{r_k^1, \ldots, r_k^N\}$ is a set of rows in the table, $T_k$, containing sufficient information supporting the assertion, $c_k$.

In one or more embodiments, the training sentence 406 with the false assertion is generated prior to being provided as the training input 404. In some embodiments, the training sentence 406 is generated using an open dataset (e.g., ToTTo), or another similar corpus of information (e.g., company financial information, other tabular data, etc.). For each data table, an assertion is created that summarizes the data table. The data tables can also be annotated by highlighting, or otherwise indicating the cell, or portion of the data table, which contributes to the truth or veracity of the assertion. The data table annotations can then be used to modify the original assertion such that the training sentence contains non-factual information about the data table. In one or more embodiments, this is done by replacing tokens within the assertion that are also part of the highlighted cells. In order to find a coherent replacement for such tokens, three replacement strategies can be applied: (1) replace one or more elements that are factually correct with a value (e.g.,) text from a cell in the same column, but from a different, randomly selected row within the same data table; (2) replace the value with a value from a different data table, making sure that the tokens follow a similar regex pattern; and (3) make no substitution to the assertion. In one or more embodiments, these replacement strategies are applied to the dataset with a ratio of 25%, 70%, and 5%, respectively. In other embodiments, the replacement strategies can be applied at different ratios. The replacement strategies can be performed either manually or automatically.

In one or more embodiments the training sentence 406 and the tokenized training sentence 408 are received by a table retriever module 110. In one or more embodiments, the table retriever module 110 includes a sentence transformer 112 and an embedding comparator 116. The sentence transformer 112 is configured to encode the training sentence 406 into a sentence embedding 412, as shown at numeral 2. In some embodiments, the sentence transformer 112 encodes the text of the training sentence 406 into an embedding or feature vector. In one or more embodiments, the training sentence 406 is encoded into a sentence embedding 412 of size 768.

After generating the sentence embedding 412, an embedding comparator 116 accesses training data tables 414, as shown at numeral 3. The training data tables 414 can vary based on the type of data that fact corrections will be performed for. For example, if the fact correction system 102 is being used to perform fact correction on financial reports, the table retriever module 110 would be trained using a corpus of financial data tables. In one or more embodiments, the data tables in training data tables 414 can be pre-processed by the fact correction system 102 to generate table view embeddings representing the data tables in the training data tables 414. The embedding comparator 116 can then identify tables from the training data tables 414 as retrieved tables 416 by comparing the sentence embedding 412 for the training sentence 406 with table view embeddings from the training data tables 414, as shown at numeral 4. The objective is to create an embedding function, $\phi$, that maps the textual representation of both $r_k^n \in R_k$ and $c_k$ to vectors with high cosine similarity among each other. For each data point, rows from other tables $\tilde{R}_k \not\subseteq T_k$ are selected to create negative retrieval examples. The tables used to create the negative retrieval examples can be either randomly chosen or retrieved using another retrieval method (e.g., Okapi BM25).

After the embedding comparator 116 identifies the retrieved tables 416, the retrieved tables 416 are sent to a loss function 418, as shown at numeral 5. The loss function 418 also receives or retrieves the ground truth data tables 410 from the training input 404, as shown at numeral 6. The training system 402 then calculates the loss between the retrieved tables 416 and the ground truth data tables 410 using loss function 418, as shown at numeral 7. In some embodiments, the loss can be calculated using the following equation:

$$L_\phi = \frac{1}{K} \sum_{k=1}^{K} \left( \hat{y}_k - \frac{\langle \phi(r_k^n), \phi(c_k) \rangle}{\|\phi(r_k^n)\| \|\phi(c_k)\|} \right)$$

where $\hat{y}_k$ is the training label, which is "1" if $r_k^n \in R_k$, or "0" if $r_k^n \in \tilde{R}_k$. The $\phi$ function is a neural network that uses a Sentence Transformer model pre-trained on a large and diverse dataset of billions of sentence pairs.

The loss is then backpropagated to the table retriever module 110, as shown at numeral 8, and used to optimize the embedding comparator 116.

Figure 5:
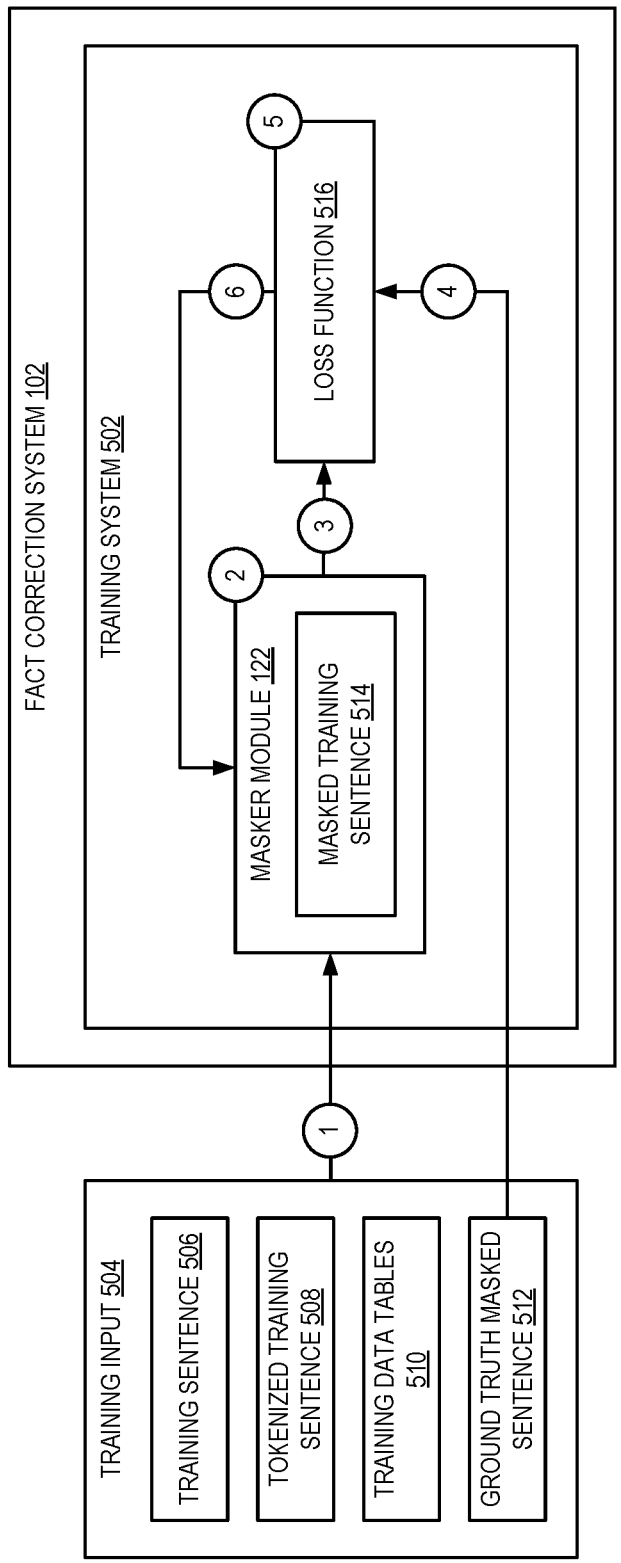
FIG. 5 illustrates a diagram of a process of training a machine learning model to identify elements of a natural language sentence that renders the natural language sentence factually incorrect in accordance with one or more embodiments.

FIG. 5 illustrates a diagram of a process of training a machine learning model to identify elements of a natural language sentence that renders the natural language sentence factually incorrect in accordance with one or more embodiments. In one or more embodiments, a training system 502 is configured to train neural networks (e.g., masker module 122) to determine the elements or values of a training sentence 506 that render the natural language sentence factually incorrect. In some embodiments, the training system 502 is a part of a fact correction system 102. In other embodiments, the training system 502 can be a standalone system, or part of another system, and deployed to the fact correction system 102. For example, the training system 502 may be implemented as a separate system implemented on electronic devices separate from the electronic devices implementing fact correction system 102. As shown in FIG. 5, the training system 502 receives a training input 504, as shown at numeral 1. For example, the fact correction system 102 receives the training input 504 from a user via a computing device or from a memory or storage location. Although the training input 504 is shown as being received by the fact correction system 102, in other embodiments, the training input 504 is received from a memory or storage location within the fact correction system 102 (e.g., training data 726 in FIG. 7). In one or more embodiments, the training input 504 includes a training sentence 506 (e.g., a natural language sentence that includes a false assertion), a tokenized training sentence 508, training data tables 510, and a ground truth masked sentence 512 that masks out the element of the training sentence 506 that renders the training sentence 506 factually incorrect. The tokenized training sentence 508 is a version of the training sentence 506 after being processed through a sentence tokenizing module (e.g., sentence tokenizing module 106 of FIG. 1). The training data tables 510 include the linearized representations of the training data tables 510. In one or more embodiments the training sentence 506, the tokenized training sentence 508, and the training data tables 510 are received by a masker module 122.

Using the training data tables 510 and the tokenized training sentence 508, the masker module 122 masks out portions of the tokenized training sentence 508, as shown at numeral 2. The masker module 122 is configured to identify which tokens of the tokenized training sentence 508 should be replaced, based on data from the linearized representations of the training data tables 510, to make the assertion in training sentence 506 true (e.g., refuted by the data in the training data tables 510). In one or more embodiments, the masker module 122 can identify one or more elements of the training sentence 506 to mask or tokenize. In one or more embodiments, the masker module 122 is implemented using a BERT language model with a token classification head. The BERT language model takes the tokenized training sentence 508 as input, and the linearized versions of the set of retrieved tables 120, in order of retrieval. The model outputs a vector $[0, 1]^S$, where the $i^{th}$ element of the vector represents a computed probability indicating whether the $i^{th}$ token should be masked. The masker module 122 can then modify the tokenized training sentence 508 into masked training sentence 514. After the masker module 122 generates the masked training sentence 514, the masked training sentence 514 is sent to a loss function 516, as shown at numeral 3. Each table-assertion tuple will be associated with an expected output vector, $\hat{y}_{masker} = \{0,1\}^S$, where each element is either 1 or 0 depending on the expected, or ground truth, value of the token.

The loss function 516 also receives or retrieves the ground truth masked sentence 512 from the training input 504, as shown at numeral 4. The training system 502 then calculates the loss between the masked training sentence 514 and the ground truth masked sentence 512 using loss function 516, using the identified tokenized element and a ground truth tokenized element for a ground truth masked sentence 512, as shown at numeral 5. In one of more embodiments, the calculated loss is a cross entropy loss. The loss is then backpropagated to the masker module 122, as shown at numeral 6, and used to optimize the masker module 122.

The training of the masker module 122 also involves providing sentences that are true (e.g., do not include any elements that render the assertion in the sentence false) in the training input 504. For true sentences, the tokenized training sentence 508 would not include any masked out elements and would be the same as the training sentence 506. The masker module 122 would be trained to predict zero tokenized elements since there are no elements in the correct sentences to be corrected.

Figure 6:
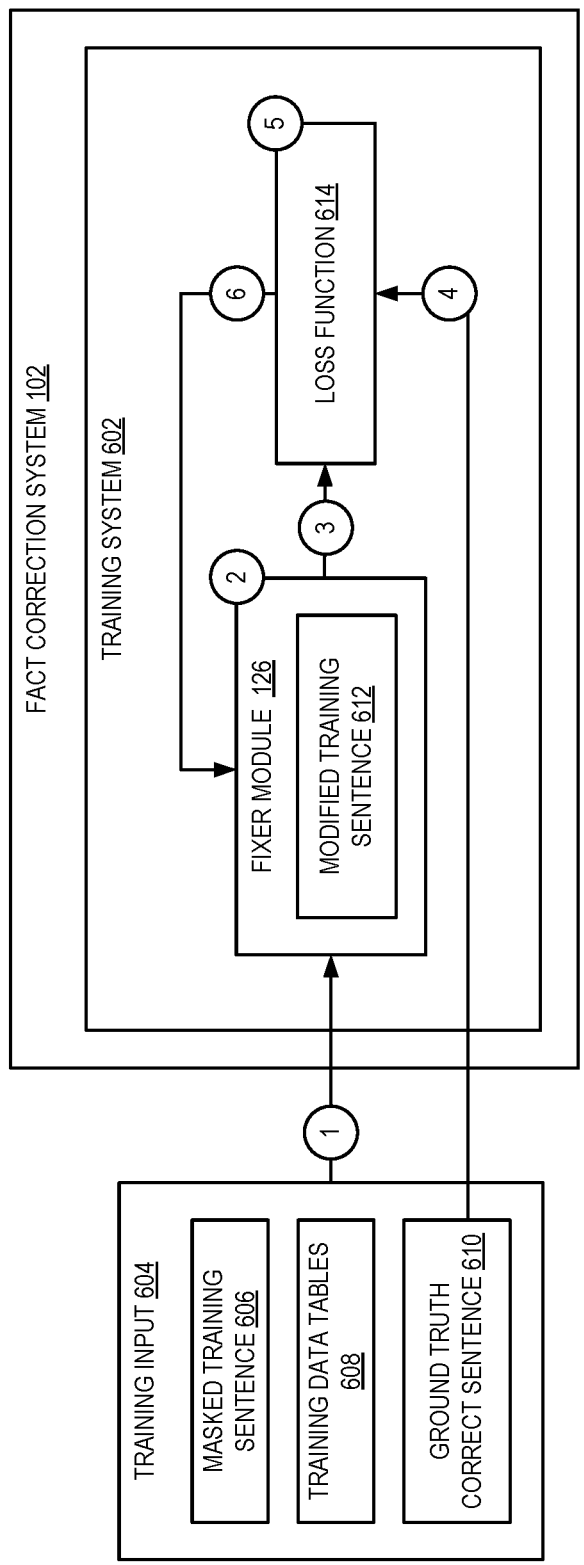
FIG. 6 illustrates a diagram of a process of training a machine learning model to replace elements of a natural language sentence that render the natural language sentence factually incorrect in accordance with one or more embodiments.

FIG. 6 illustrates a diagram of a process of training a machine learning model to replace elements of a natural language sentence that render the natural language sentence factually incorrect in accordance with one or more embodiments. In one or more embodiments, a training system 602 is configured to train neural networks (e.g., fixer module 126) to determine replacement values for masked out elements of masked training sentence 606 that would render the masked training sentence 606 factually correct. In some embodiments, the training system 602 is a part of a fact correction system 102. In other embodiments, the training system 602 can be a standalone system, or part of another system, and deployed to the fact correction system 102. For example, the training system 602 may be implemented as a separate system implemented on electronic devices separate from the electronic devices implementing fact correction system 102. As shown in FIG. 6, the training system 602 receives a training input 604, as shown at numeral 1. For example, the fact correction system 102 receives the training input 604 from a user via a computing device or from a memory or storage location. Although the training input 604 is shown as being received by the fact correction system 102, in other embodiments, the training input 604 is received from a memory or storage location within the fact correction system 102 (e.g., training data 726 in FIG. 7). In one or more embodiments, the training input 604 includes a masked training sentence 606, training data tables 608, and a ground truth correct sentence 610 that includes the values in place of masked elements of the masked training sentence 606 that make the masked training sentence 606 factually correct. In one or more embodiments, the masked training sentence 606 is the same masked tokens, $\hat{y}_{masker}$, generated for the training of the masker module (e.g., as described in FIG. 5), with the original assertion, c, replaced with the sentinel tokens. The training data tables 608 include linearized forms of the data tables in training data tables 608. For example, a linearization technique is applied that transforms the row of a table to the following: "[Title of Table]; [Header of First Column] is [First Cell of Row]; . . . ; [Header of Last Column] is [Last Cell of Row]". The training data tables 608 include the linearized representations of the training data tables 608. In one or more embodiments the masked training sentence 606 and the training data tables 608 are received by a fixer module 126.

Using the masked training sentence 606 and the training data tables 608, the fixer module 126 determines new training values (e.g., new words, phrases, etc., that make the assertion factually correct) for masked elements of the masked training sentence 606, as shown at numeral 2. The fixer module 126 is configured to correct the assertion in the masked training sentence 606 by replacing masked out elements with values that make the assertion factually correct. In one or more embodiments, the fixer module 126 fine tunes a T5 language model and outputs values that can fill in the masked portions of the masked training sentence 606. In some embodiments, the fixer module 126 uses available T5 sentinel tokens (e.g., unique mask tokens <extra_id_0>, <extra_id_1>, etc.) that were originally used for unsupervised denoising training. In one or more embodiments, a sequence-to-sequence training is used, where the fixer module 126 uses an encoder-decoder model to predict the probability of the next token given a context from a previous token. The output of the fixer module 126 can then be used to generate modified training sentence 612 with the assertion in the training sentence corresponding to masked training sentence 606, corrected based on the data in the training data tables 608. After the fixer module 126 generates the modified training sentence 612, the modified training sentence 612 is sent to a loss function 614, as shown at numeral 3.

The loss function 614 also receives or retrieves the ground truth correct sentence 610 from the training input 604, as shown at numeral 4. The training system 602 then calculates the loss between the modified training sentence 612 and the ground truth correct sentence 610 using loss function 614 using the new training value in the modified training sentence 612 and a ground truth value for the ground truth correct sentence 610, as shown at numeral 5. In one of more embodiments, the calculated loss is a cross entropy loss. The loss is then backpropagated to the fixer module 126, as shown at numeral 6, and used to optimize the fixer module 126.

In an alternative embodiment, the fact correction system 102 can perform fact correction of natural language sentence using two machine learning models. For example, with reference to FIG. 1, instead of providing the natural language sentence 105 and the set of retrieved tables 120 (e.g., retrieved in numeral 7 of FIG. 1) to the masker module 122 to create masked sentence 124, the natural language sentence 105 and the set of retrieved tables 120 can be sent directly to the fixer module 126. In this embodiment, the encoder-decoder model (e.g., the T5 language model) of the fixer module 126 can directly transform the natural language sentence 105 to the modified natural language sentence 128, bypassing the masker module 122. In addition, with reference to FIG. 6, to train the fixer module 126 in the two machine learning model embodiment, the training input 604 can include a training sentence (e.g., training sentence 506) in place of a masked sentence generated from a training sentence (e.g., masked training sentence 606). The training process of the fixer module 126 would then proceed as described in FIG. 6.

Figure 7:
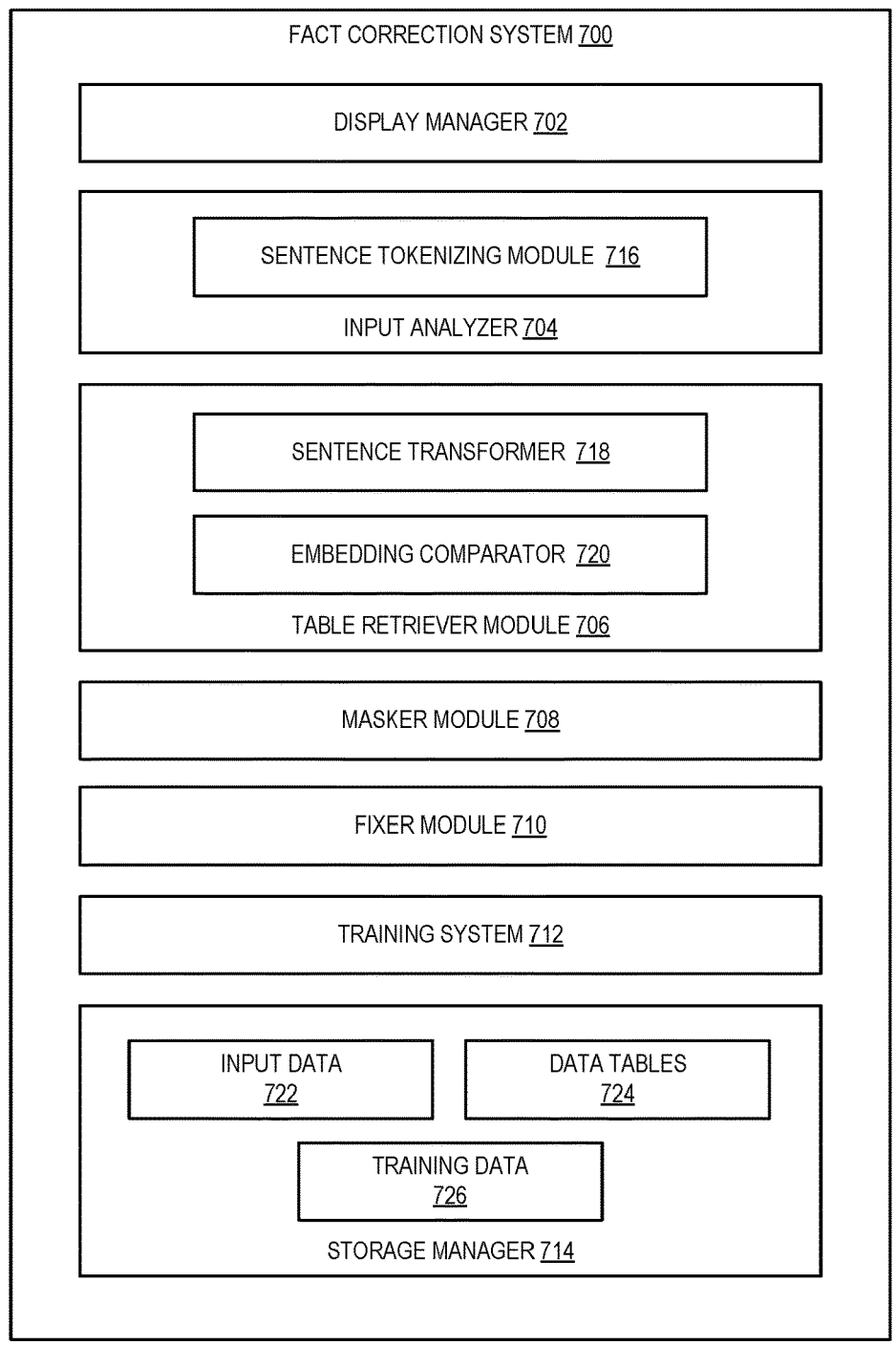
FIG. 7 illustrates a schematic diagram of a fact correction system in accordance with one or more embodiments.

FIG. 7 illustrates a schematic diagram of a fact correction system (e.g., "fact correction system" described above) in accordance with one or more embodiments. As shown, the fact correction system 700 may include, but is not limited to, a display manager 702, an input analyzer 704, a table retriever module 706, a masker module 708, a fixer module 710, a training system 712, and a storage manager 714. As shown, the input analyzer 704 includes a sentence tokenizing module 716. The table retriever module 706 includes a sentence transformer 718 and an embedding comparator 720. The storage manager 714 includes input data 722, data tables 724, and training data 726.

As illustrated in FIG. 7, the fact correction system 700 includes a display manager 702. In one or more embodiments, the display manager 702 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 702 may identify, display, update, or otherwise provide various user interfaces that include one or more display elements in various layouts. In one or more embodiments, the display manager 702 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 7, the fact correction system 700 also includes an input analyzer 704. The input analyzer 704 analyzes an input received by the fact correction system 700 to identify the natural language sentence. In one or more embodiments, the input analyzer 704 also includes a sentence tokenizing module 716 configured to tokenize elements of the natural language sentence, which can include words, phrases, etc. After being processed by the sentence tokenizing module 716, the natural language sentence can be expressed as a series of tokens $c=c_1, c_2, \ldots, c_S$, where S is the number of words and/or phrases in the natural language sentence.

As further illustrated in FIG. 7, the fact correction system 700 also includes a table retriever module 706. The table retriever module 706 includes at least a sentence transformer 718 and an embedding comparator 720. The sentence transformer 718 is configured to extract features, or feature vectors, for natural language sentences to create a sentence embedding representation of the natural language sentences. The embedding comparator 720 is configured to retrieve tables from a data tables database or storage (e.g., data tables 724) by comparing the sentence embedding generated for an input natural language sentence with table view embeddings for tables from the data tables storage. In one or more embodiments, the table view embeddings can also be generated by the sentence transformer 718, either through pre-processing before the input natural language sentence is received, or as natural language sentences are received.

As further illustrated in FIG. 7, the fact correction system 700 also includes a masker module 708 configured to identify which tokens of the tokenized sentence should be replaced, with data from the set of retrieved tables, to make the assertion in the input natural language sentence true (e.g., an element of the natural language sentence refuted by the data in the set of retrieved tables). In one or more embodiments, the masker module 708 is implemented using a BERT language model with a token classification head. The BERT language model takes a tokenized sentence as input, and the linearized versions of the set of retrieved tables, in order of retrieval. The output of the masker module 708 is a masked sentence that is then sent to a fixer module 710.

As further illustrated in FIG. 7, the fact correction system 700 also includes a fixer module 710 configured to correct the assertion in the natural language sentence 105 by replacing masked out portions of the tokenized sentence with correct values. In one or more embodiments, the fixer module 710 fine tunes a T5 language model and outputs values that can fill in the masked portions of the masked sentence. The output of the fixer can then be used to generate a modified natural language sentence with the assertion in the natural language sentence corrected based on the data in the set of retrieved tables.

As further illustrated in FIG. 7, the fact correction system 700 includes training system 712 which is configured to teach, guide, tune, and/or train one or more neural networks. In particular, the training system 712 trains the embedding comparator 720 to retrieve the most appropriate table based on the elements of the natural language sentence, the masker module 708 to identify elements of a natural language sentence to mask out as being factually incorrect based on retrieved tables, and the fixer module 710 to fix, or correct, a natural language sentence by replacing masked out elements that are factually incorrect with information from data tables that make the natural language sentence factually correct.

As further illustrated in FIG. 7, the storage manager 714 includes input data 722, data tables 724, and training data 726. In particular, the input data 722 may include an input natural language sentences received by the fact correction system 700, including tokenized forms of the natural language sentences generated by the sentence tokenizing module 716. The data tables 724 may include tables of data, where the tables can be represented in a linearized sentence form. For example, a linearization technique can be applied that transforms each row of a table to the following: "[Title of Table]; [Header of First Column] is [First Cell of Row]; . . . ; [Header of Last Column] is [Last Cell of Row]". In some embodiments, the data tables 724 also include table view embeddings (or table feature vectors) representing the contents of each row of tables. In one or more embodiments, the training data 726 may include training natural language sentences. The training natural language sentences can include factually correct sentences and sentences with factually incorrect elements and corresponding ground truth correct sentences with the incorrect elements replaced with factually correct elements) used during a training process of the fact correction system 700 to train the fixer module 126. The training data 726 can also include training data tables. The training data 726 can also include correlations between training natural language sentences and data tables to train the embedding comparator 720 to retrieve the most appropriate data tables that are related to the elements of the training natural language sentences.

Each of the components 702-714 of the fact correction system 700 and their corresponding elements (as shown in FIG. 7) may be in communication with one another using any suitable communication technologies. It will be recognized that although components 702-714 and their corresponding elements are shown to be separate in FIG. 7, any of components 702-714 and their corresponding elements may be combined into fewer components, such as into a single facility or module, divided into more components, or configured into different components as may serve a particular embodiment.

The components 702-714 and their corresponding elements can comprise software, hardware, or both. For example, the components 702-714 and their corresponding elements can comprise one or more instructions stored on a computer-readable storage medium and executable by processors of one or more computing devices. When executed by the one or more processors, the computer-executable instructions of the fact correction system 700 can cause a client device and/or a server device to perform the methods described herein. Alternatively, the components 702-714 and their corresponding elements can comprise hardware, such as a special purpose processing device to perform a certain function or group of functions. Additionally, the components 702-714 and their corresponding elements can comprise a combination of computer-executable instructions and hardware.

Furthermore, the components 702-714 of the fact correction system 700 may, for example, be implemented as one or more stand-alone applications, as one or more modules of an application, as one or more plug-ins, as one or more library functions or functions that may be called by other applications, and/or as a cloud-computing model. Thus, the components 702-714 of the fact correction system 700 may be implemented as a stand-alone application, such as a desktop or mobile application. Furthermore, the components 702-714 of the fact correction system 700 may be implemented as one or more web-based applications hosted on a remote server. Alternatively, or additionally, the components of the fact correction system 700 may be implemented in a suit of mobile device applications or "apps."

Figure 8:
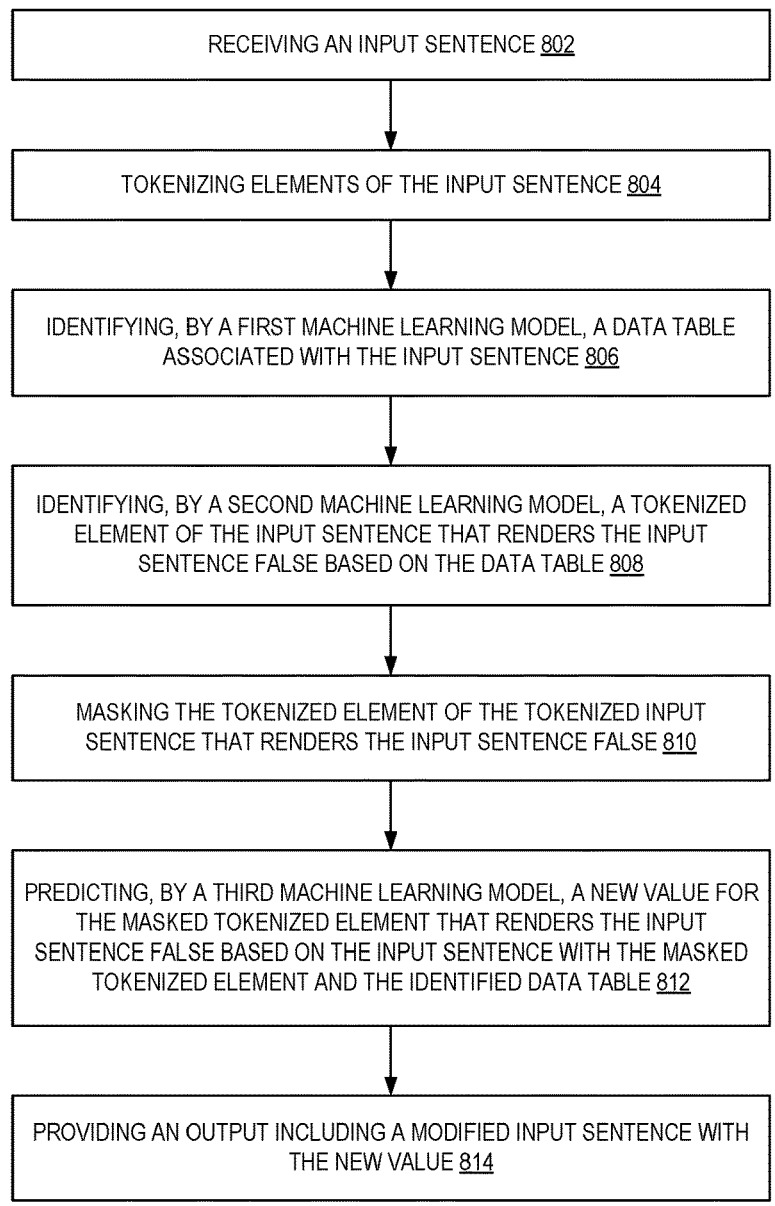
FIG. 8 illustrates a flowchart of a series of acts in a method of modifying an input natural language sentence to correct a factually incorrect assertion in accordance with one or more embodiments.

FIGS. 1-7, the corresponding text, and the examples, provide a number of different systems and devices that allow a fact correction system to correct elements of a natural language sentence that render the sentence factually incorrect. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method of modifying an input natural language sentence to correct a factually incorrect assertion in accordance with one or more embodiments. In one or more embodiments, the method 800 is performed in a digital medium environment that includes the fact correction system 700. The method 800 is intended to be illustrative of one or more methods in accordance with the present disclosure and is not intended to limit potential embodiments. Alternative embodiments can include additional, fewer, or different steps than those articulated in FIG. 8.

As shown in FIG. 8, the method 800 includes an act 802 of receiving an input sentence. In one or more embodiments, the input sentence is a natural language sentence that contains an assertion. In one or more embodiments, the fact correction system receives the input sentence from a user (e.g., via a computing device). In one or more embodiments, the user may select the input sentence in an application, or the user may submit the input sentence to a web service or an application configured to receive inputs. The input sentence can also be a portion selected from a document. For example, after providing the document to the application, the application can provide an interface to enable the user to select a portion of the document. In other embodiments, the application is a word processing application, where the natural language sentence can be manually selected by a user or automatically selected for fact correction by either the word processing application or the fact correction system.

As shown in FIG. 8, the method 800 also includes an act 804 of tokenizing elements of the input sentence. In one or more embodiments, a sentence tokenizing module 106 breaks up the natural language sentence into segments/pieces (e.g., words, phrases, etc.). Some characters, such as punctuations, can be discarded or otherwise ignored by the sentence tokenizing module. After being processed by the sentence tokenizing module, the natural language sentence can be expressed as, or represented by, a series of tokens, $c=c_1, c_2, \ldots, c_S$, where S is the number of words and/or phrases in the natural language sentence.

As shown in FIG. 8, the method 800 also includes an act 806 of identifying, by a first machine learning model, a data table associated with the input sentence. In one or more embodiments, the input sentence is provided to a sentence transformer to generate a query embedding (e.g., feature vector) representation of the input sentence. The query embedding for the input sentence can then be compared to table view embeddings for a plurality of data tables. The table view embeddings can be retrieved from a storage or memory location, with the corresponding data tables. In some embodiments, the table view embeddings are generated by passing the plurality of data tables through a transformer (e.g., the sentence transformer or another transformer). In one or more embodiments a similarity value is computed between the query embedding and each of the retrieved table view embeddings. The data tables corresponding to the table view embeddings can then be ranked based on the computed similarity values. Based on the ranked similarity values, the data table(s) with the highest computed similarity value to the query embedding can be identified.

As shown in FIG. 8, the method 800 also includes an act 808 of identifying, by a second machine learning model, a tokenized element of the input sentence that renders the input sentence false based on the data table. In one or more embodiments, the second machine learning model is a masker module configured to identify which tokens of the tokenized sentence should be replaced with data from the identified data tables to make the assertion in the input sentence true (e.g., based on the corpus of the identified data tables). In one or more embodiments, the masker module is implemented using a BERT language model with a token classification head. The BERT language model takes the tokenized sentence as input, and the linearized versions of the identified data tables, in order of retrieval.

As shown in FIG. 8, the method 800 also includes an act 810 of masking, by the second machine learning model, the tokenized element of the tokenized input sentence that renders the input sentence false. In one or more embodiments, the second machine learning model is a masker module that is implemented using a BERT language model with a token classification head. In one or more embodiments, the masker module determines an error probability (or probability of falseness) for each of the tokenized elements of the input sentence based on the table view embeddings for the identified data table. The tokenized element, or elements, which has a probability of falseness above a threshold value may then be identified as being the tokenized element that renders the input sentence false. The identified tokenized element may then be masked.

As shown in FIG. 8, the method 800 also includes an act 812 of predicting, by a third machine learning model, a new value for the masked tokenized element that renders the input sentence false based on the input sentence with the masked tokenized element and the identified data table. In one or more embodiments, the third machine learning model is a fixer module that includes a T5 language model configured to output values for the masked elements in the masked sentence. In one or more embodiments, the fixer model evaluates the masked tokenized elements and the table view embeddings for the identified data table to predict the new value for the masked tokenized element that would render the input sentence true. Once the new value is predicted, a modified input sentence is generated using the new value in place of the masked tokenized element.

Where the input sentence was factually correct as provided to the fact correction system, the output of the fixer module would be identical or similar to the input sentence.

As shown in FIG. 8, the method 800 also includes an act 814 of providing an output including the modified input sentence with the new value. In one or more embodiments, the fact correction system can display the modified input sentence in a user interface. For example, the modified input sentence can be presented on a user interface on the user computing device that submitted the request to perform the fact correction or where the fact correction process was initiated from. Where the input sentence was from a word processing application, the input sentence can be highlighted, or otherwise spotlighted, and the modified input sentence can automatically replace the input sentence or provided (e.g., in a drop down menu) to allow the user to select the modified input sentence as a replacement for the input sentence. In some embodiments, more than one modified input sentence can be provided as options for replacement of the input sentence with the incorrect assertion.

Figure 9:
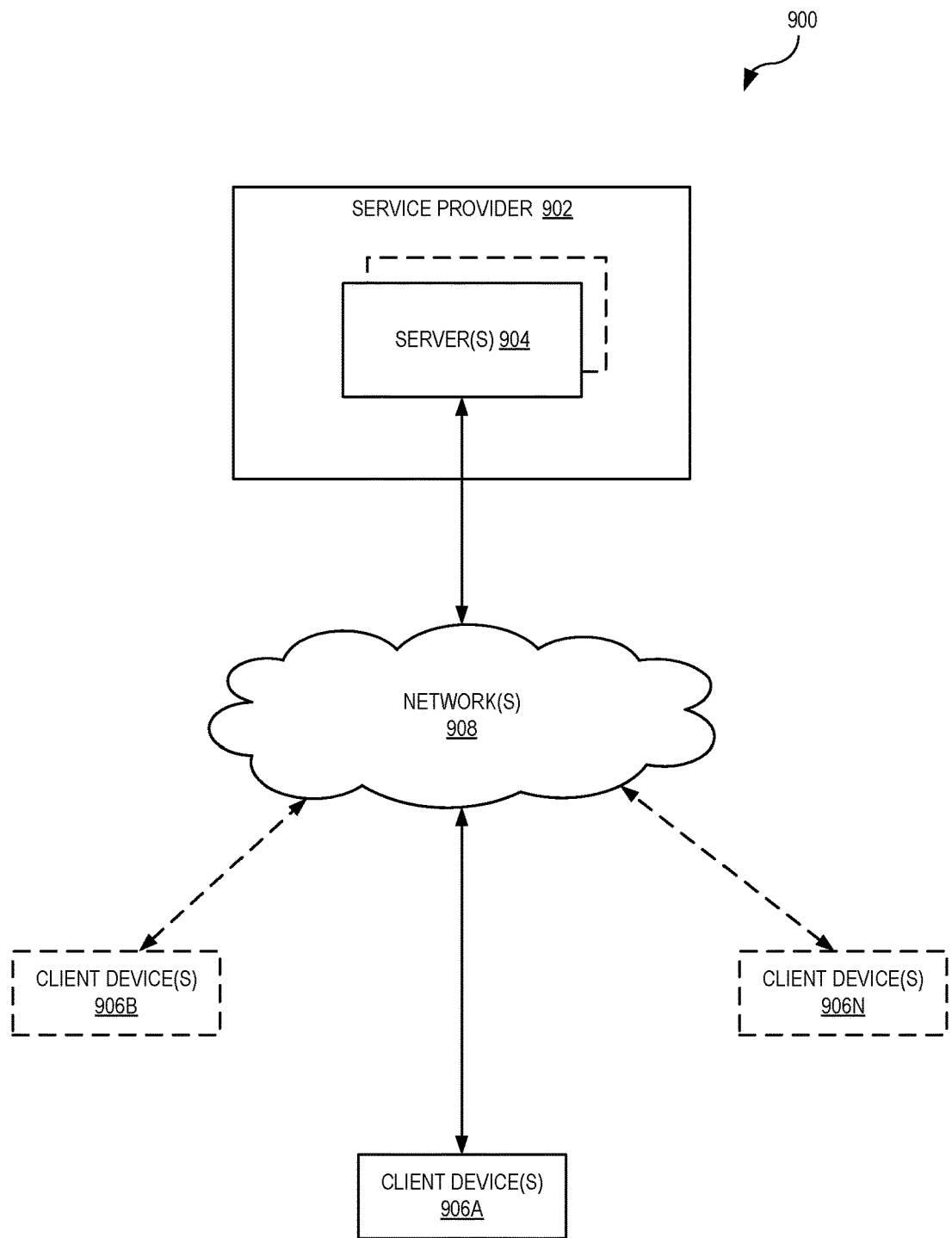
FIG. 9 illustrates a schematic diagram of an exemplary environment in which the fact correction system can operate in accordance with one or more embodiments.

FIG. 9 illustrates a schematic diagram of an exemplary environment 900 in which the fact correction system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the fact correction system 700. In particular, the fact correction system 700 may be implemented in whole or in part on the client device 906A. Alternatively, in some embodiments, the environment 900 is implemented in a distributed architecture across multiple computing devices.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access the service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including input data 722, data tables 724, and training data 726, or other information. For example, a server 904 may receive data from a client device, such as the client device 906A, and send the data to another client device, such as the client device 906B and/or 906N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the fact correction system 700. In particular, the fact correction system 700 can comprise an application running on the one or more servers 904 or a portion of the fact correction system 700 can be downloaded from the one or more servers 904. For example, the fact correction system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or web site hosted at the one or more servers 904.

Upon the client device 906A accessing a webpage or other web application hosted at the one or more servers 904, in one or more embodiments, the one or more servers 904 can provide a user of the client device 906A with an interface to provide inputs, including a natural language sentence. Upon receiving the natural language sentence, the one or more servers 904 can automatically perform the methods and processes described above to fact correct elements of the natural language sentence.

As just described, the fact correction system 700 may be implemented in whole, or in part, by the individual elements 902-908 of the environment 900. It will be appreciated that although certain components of the fact correction system 700 are described in the previous examples with regard to particular elements of the environment 900, various alternative implementations are possible. For instance, in one or more embodiments, the fact correction system 700 is implemented on any of the client devices 906A-906N. Similarly, in one or more embodiments, the fact correction system 700 may be implemented on the one or more servers 904. Moreover, different components and functions of the fact correction system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
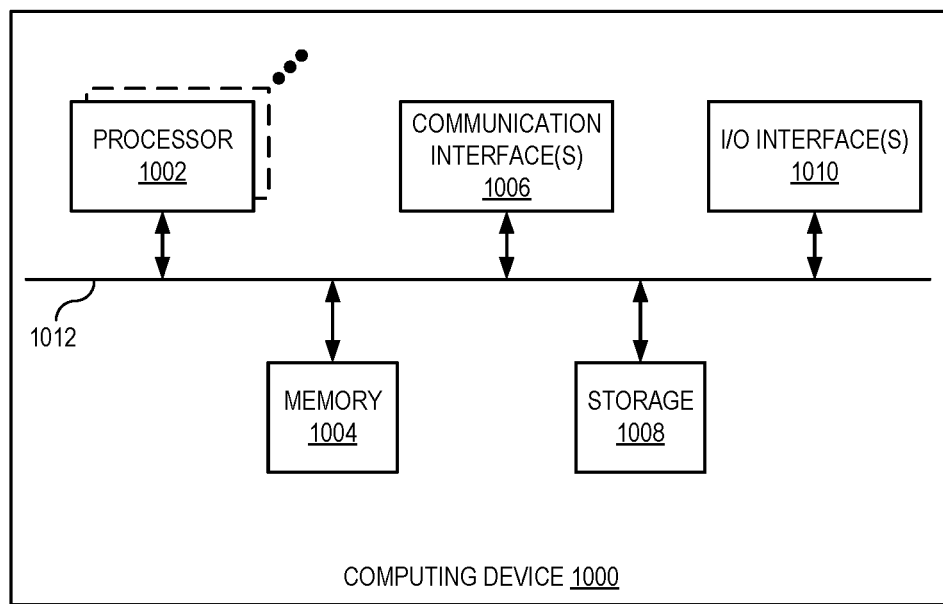
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the fact correction system 700. As shown by FIG. 10, the computing device can comprise a processor 1002, memory 1004, one or more communication interfaces 1006, a storage device 1008, and one or more input or output ("I/O") devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more I/O devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving an input sentence;
   tokenizing elements of the input sentence;
   generating, by a sentence transformer, a sentence embedding representing the input sentence;
   identifying, by comparator, a data table correlated to content of the input sentence by comparing the sentence embedding representing the input sentence with stored table view embeddings for a plurality of data tables, each stored table view embedding including a plurality of row embeddings generated from text representations of each row of the plurality of data tables;
   identifying, by a first machine learning model, a tokenized element of the input sentence that renders the input sentence false based on the identified data table;
   masking the tokenized element of the input sentence that renders the input sentence false;
   predicting, by a second machine learning model, a new value for the masked tokenized element that renders the input sentence false based on the input sentence with the masked tokenized element and the identified data table; and
   providing an output including a modified input sentence with the new value.

2. The computer-implemented method of claim 1, wherein identifying the data table correlated to the content of the input sentence comprises:
   retrieving the stored table view embeddings for the plurality of data tables;
   computing a similarity value between the sentence embedding and each of the stored table view embeddings; and
   identifying the data table from the plurality of data tables having a table view embedding with a highest computed similarity value to the sentence embedding.

3. The computer-implemented method of claim 2, further comprising:
   generating the stored table view embeddings for each data table of the plurality of data tables by:
      generating linearized representations of each row of a data table, and
      generating a plurality of row embeddings using the linearized representations of each row of the data table, wherein each row embedding of the plurality of row embeddings is associated with a single row of the data table.

4. The computer-implemented method of claim 2, wherein masking the tokenized element of the input sentence that renders the input sentence false comprises:
   determining, by the second machine learning model, an error probability for each of the tokenized elements of the input sentence based on the table view embeddings for the identified data table;
   identifying the tokenized element having an error probability above a threshold value as being the tokenized element that renders the input sentence false; and
   masking the identified tokenized element.

5. The computer-implemented method of claim 4, wherein predicting the new value for the tokenized element that renders the input sentence false based on the input sentence with the masked tokenized element and the identified data table comprises:
   receiving, by the second machine learning model, the input sentence with the masked tokenized element and the table view embeddings for the identified data table;
   evaluating the masked tokenized elements and the table view embeddings to predict the new value for the masked tokenized element that renders the input sentence true; and
   generating the modified input sentence using the new value in place of the masked tokenized element.

6. The computer-implemented method of claim 1, wherein the second machine learning model is trained by:

receiving, by the second machine learning model, a training input, the training input including a training sentence, a tokenized training sentence, and training data tables;

determining an error probability for each tokenized element of the training sentence based on table view embeddings for the training data tables;

identifying a tokenized element having an error probability above a threshold value as being the tokenized element that renders the training sentence false; and training the second machine learning model using the identified tokenized element and a ground truth tokenized element for a ground truth masked sentence.

7. The computer-implemented method of claim 1, wherein the second machine learning model is trained by:

receiving, by the second machine learning model, a training input, the training input including a masked training sentence and training data tables;

evaluating tokenized elements of the masked training sentence and table view embeddings for the training data tables to predict a new training value for the tokenized elements of the masked training sentence that renders the masked training sentence true; and training the second machine learning model using the new training value for the masked training sentence and a ground truth value for a ground truth correct sentence.

8. The computer-implemented method of claim 1, further comprising:

receiving a second input sentence;

tokenizing second elements of the second input sentence;

generating, by the sentence transformer, a second sentence embedding representing the second input sentence;

identifying, by the comparator, a second data table correlated to content of the second input sentence by comparing the second sentence embedding representing the second input sentence with the stored table view embeddings for the plurality of data tables;

determining, by the first machine learning model, that no tokenized second elements of the second input sentence render the second input sentence false based on the second data table; and providing a second output including the second input sentence.

9. A non-transitory computer-readable storage medium including instructions stored thereon which, when executed by at least one processor, cause the at least one processor to:

receive an input sentence;

tokenize elements of the input sentence;

generate, by a sentence transformer, a sentence embedding representing the input sentence;

identify, by a comparator, a data table correlated to content of the input sentence by comparing the sentence embedding representing the input sentence with stored table view embeddings for a plurality of data tables, each stored table view embedding including a plurality of row embeddings generated from text representations of each row of the plurality of data tables;

identify, by a first machine learning model, a tokenized element of the input sentence that renders the input sentence false based on the identified data table;

mask the tokenized element of the input sentence that renders the input sentence false;

predict, by a second machine learning model, a new value for the masked tokenized element that renders the input sentence false based on the input sentence with the masked tokenized element and the identified data table; and provide an output including a modified input sentence with the new value.

10. The non-transitory computer-readable storage medium of claim 9, wherein to identify the data table associated with the input sentence, the instructions, when executed, further cause the at least one processor to:

retrieve the stored table view embeddings for the plurality of data tables;

compute a similarity value between the sentence embedding and each of the stored table view embeddings; and identify the data table from the plurality of data tables having a table view embedding with a highest computed similarity value to the sentence embedding.

11. The non-transitory computer-readable storage medium of claim 10, wherein the instructions, when executed, further cause the at least one processor to:

generate the stored table view embeddings for each data table of the plurality of data tables by:

generating linearized representations of each row of a data table, and generating a plurality of row embeddings using the linearized representations of each row of the data table, wherein each row embedding of the plurality of row embeddings is associated with a single row of the data table.

12. The non-transitory computer-readable storage medium of claim 10, wherein to mask the tokenized element of the input sentence that renders the input sentence false, the instructions, when executed, further cause the at least one processor to:

determine, by the second machine learning model, an error probability for each of the tokenized elements of the input sentence based on the table view embeddings for the identified data table;

identify the tokenized element having an error probability above a threshold value as being the tokenized element that renders the input sentence false; and mask the identified tokenized element.

13. The non-transitory computer-readable storage medium of claim 12, wherein to predict the new value for the tokenized element that renders the input sentence false based on the input sentence with the masked tokenized element and the identified data table, the instructions, when executed, further cause the at least one processor to:

receive, by the second machine learning model, the input sentence with the masked tokenized element and the table view embeddings for the identified data table;

evaluate the masked tokenized elements and the table view embeddings to predict the new value for the masked tokenized element that renders the input sentence true; and generate the modified input sentence using the new value in place of the masked tokenized element.

14. The non-transitory computer-readable storage medium of claim 9, wherein the second machine learning model is trained by:

receiving, by the second machine learning model, a training input, the training input including a training sentence, a tokenized training sentence, and training data tables;

determining an error probability for each tokenized element of the training sentence based on table view embeddings for the training data tables;

identifying a tokenized element having an error probability above a threshold value as being the tokenized element that renders the training sentence false; and training the second machine learning model using the identified tokenized element and a ground truth tokenized element for a ground truth masked sentence.

15. The non-transitory computer-readable storage medium of claim 9, wherein the second machine learning model is trained by:

receiving, by the second machine learning model, a training input, the training input including a masked training sentence and training data tables;

evaluating tokenized elements of the masked training sentence and table view embeddings for the training data tables to predict a new training value for the tokenized elements of the masked training sentence that renders the masked training sentence true; and training the second machine learning model using the new training value for the masked training sentence and a ground truth value for a ground truth correct sentence.

16. The non-transitory computer-readable storage medium of claim 9, wherein the instructions, when executed, further cause the at least one processor to:

receive a second input sentence;

tokenize second elements of the second input sentence;

generate, by the sentence transformer, a second sentence embedding representing the second input sentence;

identify, by the comparator, a second data table correlated to content of the second input sentence by comparing the second sentence embedding representing the second input sentence with the stored table view embeddings for the plurality of data tables;

determine, by the first machine learning model, that no tokenized second elements of the second input sentence render the second input sentence false based on the second data table; and provide a second output including the second input sentence.

17. A system, comprising:

a computing device including a memory and at least one processor, the computing device implementing a fact correction system, wherein the memory includes instructions stored thereon which, when executed, cause the fact correction system to:

receive an input sentence;

tokenize elements of the input sentence;

generate, by a sentence transformer, a sentence embedding representing the input sentence;

identify, by a comparator, a data table correlated to content of the input sentence by comparing the sentence embedding representing the input sentence with stored table view embeddings for a plurality of data tables, each stored table view embedding including a plurality of row embeddings generated from text representations of each row of the plurality of data tables;

identify, by a first machine learning model, a tokenized element of the input sentence that renders the input sentence false based on the identified data table;

mask the tokenized element of the input sentence that renders the input sentence false;

predict, by a second machine learning model, a new value for the masked tokenized element that renders the input sentence false based on the input sentence with the masked tokenized element and the identified data table; and provide an output including a modified input sentence with the new value.

18. The system of claim 17, wherein the instructions to identify the data table associated with the input sentence further cause the fact correction system to:

retrieve the stored table view embeddings for the plurality of data tables;

compute a similarity value between the sentence embedding and each of the stored table view embeddings; and identify the data table from the plurality of data tables having a table view embedding with a highest computed similarity value to the sentence embedding.

19. The system of claim 18, wherein the instructions, when executed, further cause the fact correction system to:

generate the stored table view embeddings for each data table of the plurality of data tables by:

generating linearized representations of each row of a data table, and generating a plurality of row embeddings using the linearized representations of each row of the data table, wherein each row embedding of the plurality of row embeddings is associated with a single row of the data table.

20. The system of claim 18, wherein the instructions to mask the tokenized element of the input sentence that renders the input sentence false further cause the fact correction system to:

determine, by the second machine learning model, an error probability for each of the tokenized elements of the input sentence based on the table view embeddings for the identified data table;

identify the tokenized element having an error probability above a threshold value as being the tokenized element that renders the input sentence false; and mask the identified tokenized element.

* * * * *